United States Patent [19]

Pastor et al.

[11] Patent Number: 4,519,986
[45] Date of Patent: May 28, 1985

[54] PROCESS FOR PREPARATION OF ULTRAPURE THORIUM FLUORIDE

[75] Inventors: Ricardo C. Pastor, Manhattan Beach; Remedios K. Chew, Long Beach, both of Calif.

[73] Assignee: Hughes Aircraft Company, El Segundo, Calif.

[21] Appl. No.: 343,637

[22] Filed: Jan. 28, 1982

[51] Int. Cl.³ .............................................. C01F 15/00
[52] U.S. Cl. ....................................... 423/19; 423/252
[58] Field of Search ................................ 423/19, 252

[56] References Cited

U.S. PATENT DOCUMENTS

| | | | |
|---|---|---|---|
| 2,397,929 | 4/1946 | Dimmick | 423/252 |
| 2,893,825 | 7/1959 | Malm et al. | 423/19 |
| 2,972,513 | 2/1961 | Mogard et al. | 423/252 |
| 2,991,149 | 7/1961 | Flynn | 423/252 |
| 3,353,929 | 11/1967 | Kracke et al. | 423/19 |
| 3,748,095 | 7/1973 | Henderson et al. | 423/252 |
| 4,341,873 | 7/1982 | Robinson et al. | 65/30.1 |

OTHER PUBLICATIONS

Pausewang et al., *Z. Anorg. Allg. Chem.*, 369 (1-2), pp. 89-104, (1969).
Heitmann et al., *Appl. Opt.*, 7 (2), 307-9, (1968).
Robinson et al., "Proceedings Electro-Optics/Laser 81 Conf. & Exh.", pp. 191-196, (Nov. 1981).

*Primary Examiner*—Edward A. Miller
*Attorney, Agent, or Firm*—Mary E. Lachman; A. W. Karambelas

[57] ABSTRACT

The specification discloses a process for the preparation of ultrapure thorium fluoride (ThF$_4$) having minimized water content and consequent maximized optical transmission of 10.6 micrometer radiation. First, thorium oxide is reacted with aqueous hydrofluoric acid to form a solid reaction product, which is then dried under controlled heating to form a hydrated thorium fluoride with a predetermined amount of hydration, namely ThF$_4$·xH$_2$O where x is equal to 0.39. The hydrated thorium fluoride is exposed to a reactive atmosphere of hydrofluoric acid vapor and a selected fluoride compound in the gas phase at elevated temperature for a predetermined period of time. The reactive atmosphere removes substantially all of the water and water-derived impurities from the hydrated thorium fluoride to produce ultrapure thorium fluoride which is highly transmissive to 10.6 micrometer radiation.

6 Claims, 1 Drawing Figure

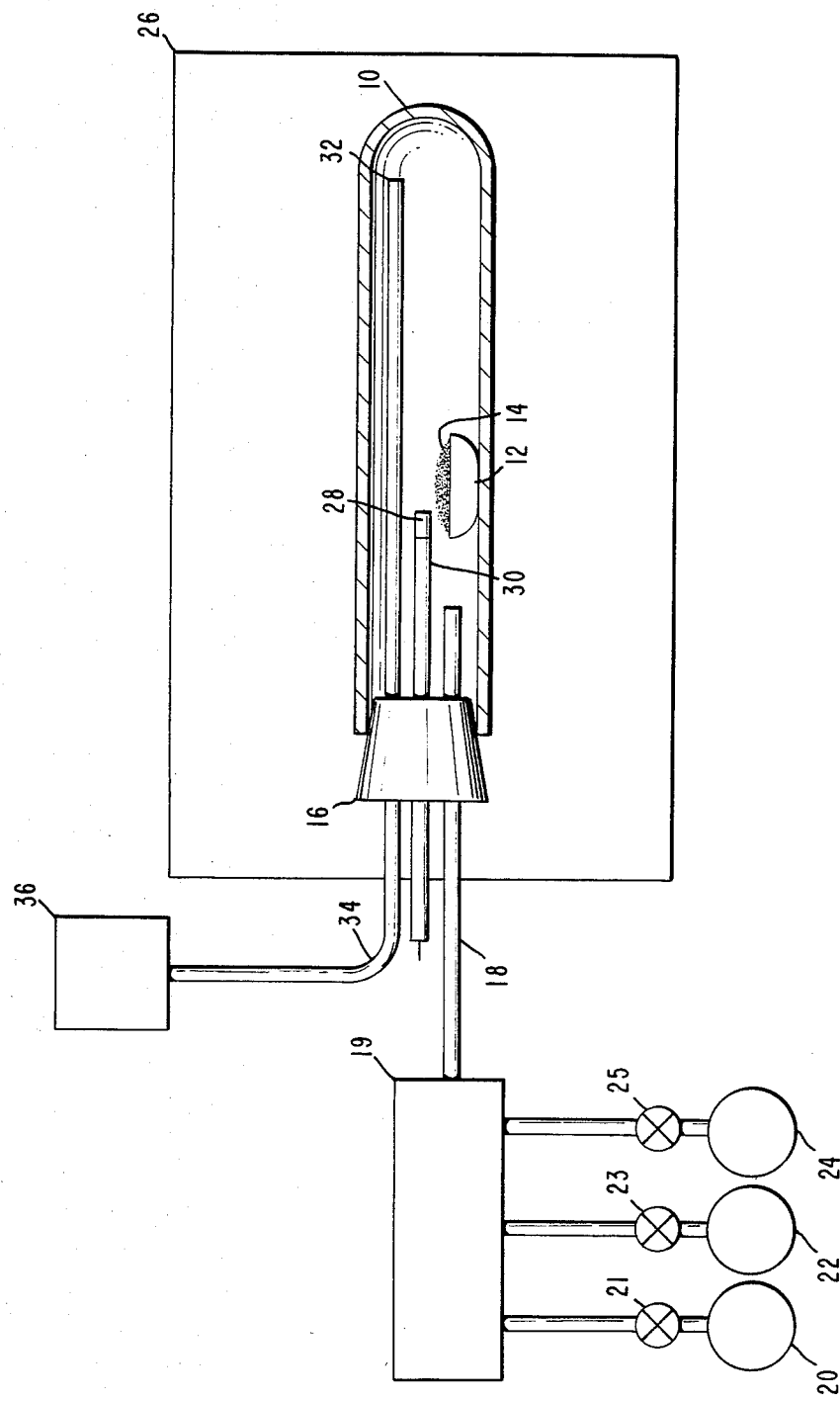

PROCESS FOR PREPARATION OF ULTRAPURE THORIUM FLUORIDE

BACKGROUND OF THE INVENTION

1. Field of the Invention

This invention relates generally to the field of metal halides and, more particularly, to a process for the preparation of thorium fluoride which is highly transmissive to 10.6 micrometer radiation.

2. Description of the Prior Art

In order to be effective, a material which is used to form an optical component, such as a laser window or optical fiber, has to be transparent to the selected wavelength of radiation it must transmit. In the particular case where a carbon dioxide ($CO_2$) laser is used as the light source, as is frequently done at the present time, the associated optical components must be transmissive to 10.6 micrometer radiation. However, it is known that polyatomic impurities degrade the optical transparency of the host material in the near infrared radiation range (i.e. 0.75 to 15.0 micrometers). This effect has been studied in detail with regard to alkali halide crystals, as discussed by C. J. Duthler in the publication entitled "Extrinsic absorption in 10.6-$\mu$m-laser-window materials due to molecular-ion impurities," in the *Journal of Applied Physics*. Vol. 45, 1974, pages 2668 to 2671. In particular, water and water vapor pose a difficult problem because these species are ubiquitous impurities that are often uncontrolled in various phases of materials preparation and processing. The impurities derived from water, namely, hydroxyl ions and hydrogen ions, degrade the near infrared transmission of alkali metal halides, as discussed in U.S. Pat. No. 3,932,597, assigned to the present assignee, and of alkaline earth metal halides, as discussed in U.S. Pat. No. 3,935,302, assigned to the present assignee.

Thorium fluoride ($ThF_4$) has recently been found to be useful for, among other things, forming thin film reflectors and anti-reflectors for use in high power carbon dioxide laser systems. When used as a reflector, the $ThF_4$ is provided as a thin film on a suitable substrate which is external to the laser resonator cavity, and the $ThF_4$ film serves to deflect the laser beam in a predetermined direction toward the target. It is, of course, desirable to deflect the laser beam efficiently in order to prevent losses in the laser beam intensity. When used as an anti-reflector, the $ThF_4$ may be coated on the surface of a window through which the laser beam must pass, such as a window through which the laser beam leaves the laser resonator cavity or a window in a chamber holding a sample, through which the laser beam passes to strike the sample. When used as an anti-reflector, the $ThF_4$ provides a refractive index at the window surface such that reflection of the laser beam is minimized and transmission of the laser beam through the window is maximized. However, in order to be suitable for such purposes, the $ThF_4$ must have a high transmission and low absorption for the 10.6 micrometer radiation from the carbon dioxide laser so that the film will not become heated sufficiently to cause destruction thereof, as discussed in greater detail in relation to Example 2 herein. It should be noted that the term "approximately 10.6 micrometers" is used herein to designate the radiation emitted from a carbon dioxide laser.

One problem with $ThF_4$ which has been studied in the past is the hygroscopic nature of $ThF_4$ powder, which is used as the starting material to deposit a thin film of $ThF_4$. While the uptake of water by the $ThF_4$ powder does not lead to hydration or hydrolysis at ordinary temperatures, the $ThF_4$ crystal hydrolyzes at approximately 350° C. The latter behavior makes the growth of $ThF_4$ crystals or films from a melt at 1120° C. sensitive to the presence of water in the vapor phase. One method of overcoming this problem is described in the publication entitled "Preparation and Crystal Growth of $ThF_4$," by R. C. Pastor and K. Arita, in the *Materials Research Bulletin*, Vol. 9, 1974, pages 579 to 584, in which a combination of wet and dry conversions was used. First, thorium oxide ($ThO_2$) powder suspended in water was reacted with a solution of hydrofluoric acid (HF) and the product, in the form of a residue, was determined to be 0.914 $ThF_4$ and 0.086 $ThF_4.4H_2O$. The residue was then treated with dry HF overnight at 500° C. and then for one hour at 700° C. While the $ThF_4$ powder so formed was shown to be significantly improved over some commercially available $ThF_4$ powders, which were either 19 percent hydrolyzed or incompletely converted to the extent that 3.5 mole percent of $ThO_2$ remained unconverted, the former material still has some residual degree of hydrolysis or incomplete conversion. However, the $ThF_4$ powder of Pastor and Arita was found to be a suitable starting charge for crystal growth of $ThF_4$ having certain improved properties. Nevertheless, even this improved $ThF_4$ was later found to be unsuitable for forming films with very low optical absorption at 10.6 micrometers.

It is the alleviation of this prior art problem of the optical absorption of $ThF_4$ films at approximately 10.6 micrometers to which the present invention is directed.

SUMMARY OF THE INVENTION

The general purpose of this invention is to provide a new and improved process for the preparation of ultrapure thorium fluoride which has maximized optical transparency to radiation of approximately 10.6 micrometers.

In order to accomplish this general purpose, we have discovered and developed a process for the preparation of ultrapure thorium fluoride having minimized water and water-derived impurities. First, thorium oxide ($ThO_2$) is reacted with a predetermined amount of hydrofluoric acid to form a solid reaction product, which is then dried under controlled heating to form a hydrated thorium fluoride having a chosen amount of hydration. Next, the hydrated thorium fluoride is exposed to a reactive atmosphere comprising hydrofluoric acid vapor and a chosen fluoride compound in the gas phase at elevated temperatures for a selected period of time, to remove substantially all of the water and water-derived impurities from the hydrated thorium fluoride and to thus provide ultrapure thorium fluoride with minimized water-derived impurities.

Accordingly, it is a further purpose of the present invention to provide a new and improved process for forming ultrapure thorium fluoride having maximized optical transmission at 10.6 micrometers and suitable for use as an optical component or in an optical system.

Another purpose of the present invention is to provide a new and improved process for forming ultrapure thorium fluoride having minimized absorption of radiation at 10.6 micrometers.

Still another purpose of the present invention is to provide a new and improved process for forming ultrapure thorium fluoride having minimized water and water-derived impurities.

Yet another purpose is to provide a process of the type described for forming ultrapure thorium fluoride having a minimized degree of hydrolysis.

A further purpose of the present invention is to provide an optical component formed from ultrapure thorium fluoride prepared by the above-described process and having maximized optical transmission at 10.6 micrometers.

A feature of the present invention is that a controlled reactive atmosphere is used during one processing step.

The foregoing and other advantages and features of the present invention will be apparent from the following more particular description of the preferred embodiments of the invention, as illustrated in the accompanying drawing.

BRIEF DESCRIPTION OF THE DRAWING

The FIGURE illustrates, in schematic form, an apparatus suitable for carrying out one step in a preferred process embodiment of the present invention.

DETAILED DESCRIPTION OF THE INVENTION

The process of the present invention for the preparation of ultrapure thorium fluoride comprises a first, wet conversion step and a second, dry conversion step. In the wet conversion step, relatively pure (i.e. 99.9 percent) thorium oxide or thoria ($ThO_2$), which is commercially available, is suspended in water and reacted at slightly elevated temperature with a predetermined amount of electronic-grade hydrofluoric acid (HF) aqueous (aq), which is 49 weight percent HF. The reaction is shown in Equation (1) below and yields a product of the formula $ThF_4 \cdot (2+n)HO$. When n equals one, the product is in a well-crystallized form. The total HF consumed is approximately 1.5 times the theoretical amount.

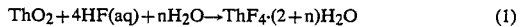

$$ThO_2 + 4HF(aq) + nH_2O \rightarrow ThF_4 \cdot (2+n)H_2O \qquad (1)$$

where $n = \leq 1$

After the reaction has been completed, the excess HF (aq) and water are removed by evaporation at or below 100° C. The residue product is weighed from time to time to determine when the desired conversion point is reached, namely when the weight ratio of the product (residue) to the starting material is typically $1.19 \pm 0.01$, at which point the product is a hydrated thorium fluoride of the general formula $ThF_4 \cdot xH_2O$ with x equal to 0.39. This particular composition of the hydrate is used because it can be achieved with relative ease and represents minimized water content for the amount of time expended. Further reduction in the water content of the hydrate can be achieved but occurs slowly and requires an extensive amount of time for a relatively small improvement in the product. It should be noted that the water of hydration cannot be removed cleanly from hydrated thorium fluoride by applying heat alone. Under such treatment, as water leaves the crystal structure, some of the water would act on the fluoride ion as shown in Equation (2) below to replace it with an oxide ion and to release HF. This reaction produces unwanted oxide contamination of the $ThF_4$ product.

$$H_2O + 2F^- \rightleftharpoons 2HF + O^{-2} \qquad (2)$$

In addition, if excessive amounts of water are present in the hydrated thorium fluoride when the latter is subjected to the HF reactive atmosphere as described in detail below, additional quantities of HF would be required to effect the desired reaction. It is more cost effective to remove some of the water of hydration by heating than to use additional HF. Further, HF in the presence of excess water becomes corrosive to the reaction chamber and the lifetime of the apparatus is considerably shortened. Consequently, the abovedescribed composition of the hydrate has been found to be optimal.

In the second, dry conversion step, the hydrated thorium fluoride product of the wet conversion step described above is subjected to reactive atmosphere processing using an apparatus of the type shown schematically in the FIGURE. The apparatus shown in the FIGURE comprises a reaction tube 10 formed of low-porosity alumina, such as 99.9 percent pure alumina obtained from Coors Porcelain Company of Golden, Colo. Within the reaction tube 10, there are placed one or more graphite boats 12, which may optionally be platinum-lined and which contain the hydrated thorium fluoride material 14 to be processed. The reaction tube 10 is closed at one end and is provided at the opposite end with a tightly-fitting cap 16 that is made of Teflon and that has various tubes passing therethrough as described below.

The reactants used in the process of the present invention enter the reaction tube 10 through the alumina tubing 18 which passes through the cap 16 into the reaction tube 10. At the opposite end, the tubing 18 is connected to the mixing chamber 19 in which the reactant gases are mixed together before being passed into the reaction tube 10. The reactant gases are contained in the chambers 20, 22, and 24, which are connected to the flowmeters or control valves 21, 23, and 25, respectively, and, in turn, to the mixing chamber 19. The reactant gases used in the process of the present invention are helium or other inert carrier gas, such as nitrogen; hydrofluoric acid (HF) vapor; and a selected fluoride compound such as Freon 14 or tetrafluoromethane ($CF_4$), all of which are commercially available.

The reaction tube 10, including the cap 16, is contained in a furnace 26 by means of which the temperature in the reaction tube 10 is raised to predetermined levels. The reaction tube 10 is provided with a thermocouple device 28 which is contained in a well formed by the alumina tubing 30 that enters the reaction tube 10 through the cap 16. The thermocouple device 28 is placed in close proximity to the material 14 to be processed and is used to monitor the temperature in the reaction chamber 10. External to the furnace 26, the thermocouple device 28 is connected by means of an electrical conductor (not shown) to a millivoltmeter (not shown) which provides a voltage reading corresponding to the temperature being sensed.

The reaction tube 10 is also provided with an alumina tubing 32 through which gaseous reactants exit from the reaction tube 10 through the cap 16; then pass through an exit tube 34 which is typically made of Teflon or polyethylene; and ultimately enter a scrubber 36 where noxious substances are removed before the exhaust gas is released to the atmosphere.

In accordance with the process of the present invention, the apparatus shown in the FIGURE is used as follows. First, a 150 to 200 gram sample of the hydrated thorium fluoride material 14 to be treated is introduced into a graphite boat 12 and the boat 12 is covered with a platinum foil. The boat 12 is placed in the reaction tube 10, the cap 16 is put in place in the reaction tube 10, and the loaded and closed reaction tube 10 is placed in the furnace 26. The reaction tube 10 is flushed for approximately one hour with commercially available dry helium (99.99 percent pure) from the reactant gas chamber 20 which passes through the flowmeter 21, mixing chamber 19, and the tubing 18. Then, HF gas, 99.9 percent pure, is introduced in parallel with the helium flow at a flow rate of approximately 2 cubic centimeters per second, and passing from the reactant gas chamber 22 through the flowmeter 23, the mixing chamber 19, and the tubing 18 into the reaction tube 10. The temperature in the reaction tube 10 is gradually raised to approximately 1260° C. by means of the furnace 26 to provide the following typical temperature-residence times: approximately one hour at 500°±50° C. and approximately sixteen hours at 750°±50° C. At approximately 900°±50° C., tetrafluoromethane ($CF_4$) gas, is also introduced into the reaction tube 10, passing from the reactant gas chamber 24 through the flowmeter 25, the mixing chamber 19, and the tubing 18. The $CF_4$ is used in the temperature range of approximately 900° to 1260° C. The residence time at approximately 1260° C. is approximately 30 minutes. The dwell time at the highest process temperature must be sufficiently long to get rid of the residual degree of hydrolysis or incomplete conversion, but not so long as to incur an appreciable volatilization loss of the product. The temperature of 1260° C. is in excess of the melting point of $ThF_4$, which is 1120° C., and thus, the $ThF_4$ is in the form of a melt at the highest process temperature, which increases the rate of reaction. For $ThF_4$, the highest process temperature may be anywhere in the range from the melting point (i.e. 1120° C.) to the point at which volatilization losses become appreciable (e.g. 1260° C.). It should be noted that the temperature-residence times discussed above apply for the sample size and reactant gas flow rates noted above. Different sample sizes or reactant gas flow rates may require different temperature residence times in order to achieve the process of the present invention, and can be empirically determined.

Upon completion of the reaction, the reaction tube 10 and furnace 26 are gradually cooled, with $CF_4$ flow being terminated at approximately 900° C. and with HF gas flow being maintained down to a temperature within the range of 700° to 750° C. After power to the furnace 26 has been turned off, helium flow is continued for another 15 hours to remove residual HF gas. The reaction tube 10 is then removed from the furnace 26, the cap 16 is removed from the reaction tube 10, and the graphite boat 12 containing the ultrapure thorium fluoride product is removed from the reaction tube 10.

In accordance with the above-described process of the present invention, thorium oxide ($ThO_2$) is converted to hydrated thorium fluoride having a predetermined amount of hydration which is chosen to minimize the extent of hydration and the degree of hydrolysis, while also minimizing the amount of time expended to remove the water of hydration. Next, the hydrated thorium fluoride is exposed to a reactive atmosphere of HF gas and a selected fluoride compound at elevated temperature. The HF gas removes water from the hydrated thorium fluoride indirectly by removing the oxide contamination of the fluoride product which the water produces. As previously discussed in relation to Equation (2) above and as further shown in Equation (3) below, when $ThF_4$ is exposed to water vapor, a reaction occurs in which some of the fluoride atoms in $ThF_4$ are replaced by oxygen atoms from the water, to produce undesired oxide contamination of the $ThF_4$. This contaminated product is represented by the formula $ThF_{4(1-\alpha)}O_{2\alpha}$, where $\alpha$ therefor ranges from 0 to 1. In the intermediate oxide-contaminated thorium fluoride formed by the above-described process of the present invention, $\alpha$ is typically 0.01, which is also the low-limit value of $\alpha$ for the best commercially available thorium fluoride as a final product.

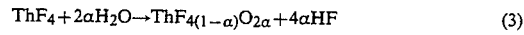

$$ThF_4 + 2\alpha H_2O \rightarrow ThF_{4(1-\alpha)}O_{2\alpha} + 4\alpha HF \qquad (3)$$

The HF reactive atmosphere then reacts with the oxide ion in the oxide-contaminated thorium fluoride as shown in Equation (4) below. The HF attacks the oxide ion in the condensed phase (i.e. the contaminated thorium fluoride) and exchanges its fluoride content therefor. Thus, the oxide contaminant is replaced by fluoride and the ultrapure $ThF_4$ of the present invention is produced. The $H_2O(g)$ produced by the reaction of Equation (4) is released from the $ThF_4$ structure.

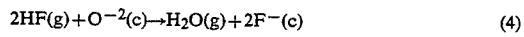

$$2HF(g) + O^{-2}(c) \rightarrow H_2O(g) + 2F^-(c) \qquad (4)$$

Consequently, the HF reactive atmosphere removes water in the form of oxide contamination which is present in the thorium fluoride.

However, another source of water contamination of the $ThF_4$ product is outgassing of water vapor from the walls of the reaction apparatus at elevated temperature. Since HF is not effective in removing water by a direct reaction therewith, an additional reactant is used. The second reactant is a chosen fluoride compound in the gas phase, such as $CF_4$, which reacts directly with water vapor to convert it to an innocuous product, and, further, forms a useful reactant HF which functions as described above. As shown in Equations (5) and (6) below, the $CF_4$ reacts with water to form HF and carbonyl fluoride ($COF_2$) as an intermediate, which then reacts further with water to form additional HF and carbon dioxide ($CO_2$), the latter being innocuous and easily swept out of the reaction chamber under inert gas flow. Thus, the $CF_4$ reactive atmosphere removes water vapor which outgasses from the walls of the apparatus and prevents this water from causing oxide contamination of the $ThF_4$ as discussed above. The $CF_4$ reactant is introduced into the reactive atmosphere at a temperature of 900°±50° C., at which temperature $CF_4$ becomes reactive with water vapor.

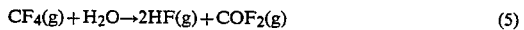

$$CF_4(g) + H_2O \rightarrow 2HF(g) + COF_2(g) \qquad (5)$$

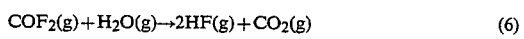

$$COF_2(g) + H_2O(g) \rightarrow 2HF(g) + CO_2(g) \qquad (6)$$

In place of $CF_4$, there may be used other fluoride compounds in the gas phase which react similarly with water vapor to form HF and also a volatile innocuous compound which can easily be swept out of the reaction chamber with an inert gas. Some suitable fluoride compounds are carbonylfluoride ($COF_2$), sulfur hexafluoride ($SF_6$), and boron trifluoride ($BF_3$). If any of these latter-mentioned fluoride compounds are used, they may be introduced into the reactive atmosphere at a much lower temperature than $CF_4$. Carbonylfluoride and boron trifluoride, in particular, react with water at room temperature and may be introduced into the reactive atmosphere at that temperature. However, these materials have the disadvantage as compared to $CF_4$ of being so highly reactive with water as to cause problems with handling the material.

The ultrapure thorium fluoride prepared in accordance with the process of the present invention may be used as the starting material for the growth of $ThF_4$ crystals, such as by the known Czochralski method, or for the deposition of a film of $ThF_4$ on a substrate by high vacuum evaporation. The ultrapure $ThF_4$ material formed in accordance with the present invention is transmissive to radiation in the range of 2.0 to 10.6 micrometers and is particularly advantageous for transmitting radiation at approximately 10.6 micrometers, such as from a carbon dioxide laser. Films of the ultrapure $ThF_4$ of the present invention have been shown to have very low optical absorption at approximately 10.6 micrometers, as discussed in greater detail in Example 2, and are, thus, highly desirable for use in optical systems requiring the transmission of 10.6 micrometer radiation. In addition, films of the ultrapure $ThF_4$ of the present invention may be used as an antireflective coating on a chosen surface as previously described herein or as a passivation layer, particularly on a material which must be transmissive to 10.6 micrometer radiation.

EXAMPLE 1

This example illustrates the preparation of ultrapure thorium fluoride by a preferred process embodiment of the present invention. A sample comprising 500 grams of $ThO_2$, 99.9 percent pure, obtained from Cerac Incorporated, of Milwaukee, Wis., was placed in a one-liter Teflon beaker; 400 milliliters (ml) of deionized water were added; and the mixture was stirred. The beaker was placed in a boiling water bath and allowed to remain for approximately 30 minutes. Then, electronic-grade aqueous HF, which was 49 weight percent HF, was added to the beaker in 30-ml portions. Time was allowed for the reaction to subside between additions of aqueous HF since the reaction is very exothermic and would otherwise cause boil-out and/or spattering losses. The total aqueous HF used was approximately 1.5 times the theoretical amount. After the reaction was completed, the excess aqueous HF and water were evaporated using the water bath as the source of heat, to form a residue. The beaker with the residue was weighed from time to time to determine when the desired conversion point had been reached, namely, when the weight ratio of the product (residue) to the starting material was $1.19 \pm 0.01$. The whole process for the wet conversion of $ThO_2$ described above took about one week to complete. The hydrated thorium fluoride, $ThF_4 \cdot xH_2O$ with $x=0.39$, was then subjected to the second, dry conversion step as described below.

Using the apparatus shown in the FIGURE and in accordance with the procedure previously described in detail, two graphite boats, each containing a sample of the hydrated thorium fluoride prepared as described above and weighing between 150 and 200 grams, were placed in the alumina reaction tube, which was capped and placed in a tubular silicon carbide furnace obtained from Lindbergh, Division of Sola Basic Industries of Watertown, Wis. The furnace was activated by the application of electric power. The reaction tube was flushed with helium, and then HF gas, obtained from Matheson, Division of Searle Medical Products Inc., of East Rutherford, N.J., was introduced. Approximately one pound of HF gas, sold as Freon 14 by Matheson, Division of Searle Medical Products Inc., of East Rutherford, N.J., was consumed per run. The $CF_4$ gas was introduced at approximately 900° C. and its use was continued to approximately 1260° C. After approximately 30 minutes at 1260° C., the assembly was gradually cooled. At approximately 900° C., $CF_4$ flow was terminated. At 700° to 750° C., the HF gas was turned off. The helium flow was maintained while electric power to the furnace was further reduced to cool down to approximately 500° C. This gradual cooldown avoids cracking of the alumina reaction tube. The power to the furnace was turned off and the helium flow was continued for an additional 15 hours to remove residual HF gas. The complete cycle for this second, dry conversion step took two days to complete. Then, the reaction tube was opened and the product was collected from the graphite boat and weighed.

Using the data obtained from the above-described reactive atmosphere treatment of the hydrated thorium fluoride, it was determined that the weight ratio of the ultrapure thorium fluoride product to the hydrated thorium fluoride starting material had an average and standard deviation of $0.97 \pm 0.03$. The theoretical value for the ratio obtained from just removing the residual water ($x=0.39$) in the hydrated thorium fluoride ($ThF_4 \cdot xH_2O$) is 0.98. Hence, the volatilization loss by the above-described process is only about one percent. The use of this ultrapure thorium fluoride material is described in Example 2.

EXAMPLE 2

This example illustrates the use of the ultrapure thorium fluoride prepared in accordance with the process of the present invention to form a component in an optical system. The ultrapure thorium fluoride prepared as described in Example 1 was used as the starting material for the deposition of a thin (e.g., approximately 2 micrometers) film of thorium fluoride on a potassium chloride or zinc selenide substrate to provide a reflector for use in a high power carbon dioxide laser system. The thorium fluoride film was formed by known high vacuum evaporation processes, as described, for example, by John L. Vossen and Werner Kern, editors of the book entitled "Thin Film Processes" Academic Press, 1978.

Using known procedures, such as described for example, in the publication by J. A. Harrington, J. E. Rudisill, and M. Braunstein, entitled "Thin-film 2.8-$\mu$m and 3.8-$\mu$m absorption in single-layer films," in *Applied Optics*, Vol. 17, No. 17, 1978, pages 2798-2801, and using a carbon dioxide laser to provide radiation of approximately 10.6 micrometers, the optical absorption of the above-described thin film of ultrapure $ThF_4$ at approximately 10.6 micrometers was measured. Based upon this measurement, it was calculated that the absorption of the ultrapure $ThF_4$ film was approximately one reciprocal centimeter (1 $cm^{-1}$), which means that 100 percent of the radiation was absorbed by a thickness of one centimeter of the ultrapure $ThF_4$. Thus, for an ultrapure $ThF_4$ layer having a thickness of 2 micrometers, only 0.02 percent of the impinging radiation would be absorbed. These thin films of ultrapure $ThF_4$ were found to be stable and to maintain their integrity when exposed to approximately 10.6 micrometer radiation from a carbon dioxide laser. This result is indicative of the fact that the ultrapure $ThF_4$ film of the present invention has sufficiently low absorption of 10.6 micrometer radiation that the film does not heat up to the critical point at which destruction would occur. The latter effect is discussed in greater detail below with regard to a prior art $ThF_4$ film.

Further, since the ultrapure $ThF_4$ of the present invention has a low absorption of 10.6 micrometer radiation, it is consequently highly tranmissive to radiation of approximately 10.6 micrometers.

The optical absorption of the ultrapure $ThF_4$ films of the present invention was found to be significantly less than that of films of commercially available $ThF_4$. Thorium fluoride films were deposited on the same type of substrate as described above, except using as the starting material commercially available 99.9 percent pure thorium fluoride, obtained from Cerac Inc. of Milwaukee, Wis. It was determined by the general procedure described above that the Cerac $ThF_4$ was ten times more absorbing at 10.6 micrometers than the ultrapure thorium fluoride films of the present invention (i.e. 100 percent of the radiation was absorbed by a thickness of 0.1 centimeter of the Cerac $ThF_4$). Thus, even a very thin film of the Cerac $ThF_4$ was found to absorb enough radiation from a carbon dioxide laser to cause destruction of the film. More specifically, hydroxyl ions present in the Cerac $ThF_4$ cause the material to absorb laser energy and heat up. The heated film of $ThF_4$ then reacts with surrounding water vapor to which it is exposed to produce further oxide contamination of the fluoride as previously discussed in relation to Equation (3). This oxide contamination renders the $ThF_4$ even more absorbing and a cascade effect occurs. The heating of the film eventually reaches a critical point at which the film is destroyed, due to evaporation or sputtering, and loss of contact with the substrate.

While the present invention has been particularly described with respect to the preferred embodiments thereof, it will be recognized by those skilled in the art that certain modifications in form and detail may be made without departing from the spirit and scope of this invention. In particular, the present invention is not limited to ultrapure thorium fluoride which is used as described herein as a film in an optical system, but includes ultrapure thorium fluoride used in any manner which takes advantage of the improved properties of this substantially water-free material and, in particular, of its low optical absorption and high transmission at 10.6 micrometers. Furthermore, the process of the present invention may be advantageously performed on other heavy metal fluorides which are known to have their optical absorption properties improved by processing in a reactive atmosphere. For example, the improved optical absorption of lead fluoride and ytterbium fluoride which have been reactive atmosphere processed is discussed in the article by Harrington et al previously referenced herein. The process of the present invention may be applied to these latter materials to provide even further improvement in their optical properties.

What is claimed is:

1. A process for preparing ultrapure thorium fluoride having minimized water and water-derived impurities, comprising the steps of:
   (a) reacting thorium oxide with a predetermined amount of aqueous hydrofluoric acid to form a solid reaction product;
   (b) drying said solid reaction product under controlled heating to form a hydrated thorium fluoride with a predetermined amount of hydration; and
   (c) exposing said hydrated thorium fluoride to a reactive atmosphere comprising hydrofluoric acid vapor and a selected fluoride compound in the gas phase at a predetermined elevated temperature for a predetermined period of time to thereby remove substantially all of said water and water-derived impurities from said hydrated thorium fluoride and to thereby provide said ultrapure thorium fluoride.

2. A process for preparing ultrapure thorium fluoride ($ThF_4$) having maximized optical transmission of radiation of approximately 10.6 micrometers, comprising the steps of:
   (a) providing thorium oxide ($ThO_2$) starting material of relatively high purity;
   (b) reacting said thorium oxide with a predetermined amount of aqueous hydrofluoric acid (HF) to form a solid reaction product;
   (c) drying said solid reaction product under controlled heating to form hydrated thorium fluoride ($ThF_4 \cdot xH_2O$); and
   (d) exposing said hydrated thorium fluoride to a reactive atmosphere comprising hydrofluoric acid vapor and a selected fluoride compound in the gas phase at a predetermined elevated temperature for a predetermined period of time to thereby produce said ultrapure thorium fluoride.

3. The process set forth in claim 2 wherein said drying of step "c" is conducted to the extent necessary to form said $ThF_4 \cdot xH_2O$ where x is 0.39.

4. The process set forth in the Claim 2 wherein said selected fluoride compound is chosen from the group consisting of tetrafluoromethane ($CF_4$), carbonylfluoride ($COF_2$), sulfur hexafluoride ($SF_6$), and boron trifluoride ($BF_3$).

5. The process set forth in claim 2 wherein said exposing of step "d" comprises:
   (1) exposing said hydrated thorium fluoride in a reaction chamber to hydrofluoric acid vapor mixed with helium carrier gas while raising the temperature in said reaction chamber up to 900°±50° C.; and
   (2) at 900°±50° C., additionally introducing tetrafluoromethane into said reaction chamber while raising the temperature in said reaction chamber to a temperature in the range of 1120° to 1260° C.

6. The process set forth in claim 5 wherein said temperature in said reaction chamber is controlled to provide the following temperature-residence times:
   (1) approximately one hour at 500°±50° C.;
   (2) approximately sixteen hours at 750°±50° C.; and
   (3) approximately 30 minutes at approximately 1260° C.

* * * * *